(12) United States Patent
Haller

(10) Patent No.: US 8,045,313 B2
(45) Date of Patent: Oct. 25, 2011

(54) SOLENOID CONTROLS, SYSTEMS, AND METHODS OF USE FOR OBTAINING OPTIMUM BATTERY LIFE

(75) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 377 days.

(21) Appl. No.: 12/066,647

(22) PCT Filed: Sep. 26, 2007

(86) PCT No.: PCT/US2007/079562
§ 371 (c)(1),
(2), (4) Date: Oct. 6, 2008

(87) PCT Pub. No.: WO2008/039853
PCT Pub. Date: Apr. 3, 2008

(65) Prior Publication Data
US 2009/0021882 A1    Jan. 22, 2009

Related U.S. Application Data

(60) Provisional application No. 60/847,482, filed on Sep. 26, 2006.

(51) Int. Cl.
*H01H 9/00* (2006.01)
*H01H 47/00* (2006.01)
*H01H 47/32* (2006.01)
*H01H 51/30* (2006.01)
(52) U.S. Cl. ........................................ 361/154; 361/160
(58) Field of Classification Search .......... 361/152–154, 361/160; 251/129.04–129.08
See application file for complete search history.

(56) References Cited

U.S. PATENT DOCUMENTS

| | | | |
|---|---|---|---|
| 5,204,610 A | 4/1993 | Pierson et al. | |
| 5,381,297 A * | 1/1995 | Weber | 361/153 |
| 5,914,847 A | 6/1999 | Alexanian et al. | |
| 6,378,838 B1 | 4/2002 | Brundisini | |
| 6,394,414 B1 * | 5/2002 | Breitling et al. | 251/129.04 |
| 6,571,773 B1 * | 6/2003 | Yamakado et al. | 123/490 |
| 7,740,225 B1 * | 6/2010 | Estelle | 251/129.05 |

OTHER PUBLICATIONS

Meyoung Ju Joung, International Search Report for International Patent Application No. PCT/US2007/079562, Korean Intellectual Property Office, Republic of Korea, dated Feb. 1, 2008.
Meyoung Ju Joung, Written Opinion for International Patent Application No. PCT/US2007/079562, Korean Intellectual Property Office, Republic of Korea, dated Feb. 1, 2008.
Simin Baharlou, International Preliminary Report on Patentability for International Patent Application No. PCT/US2007/079562, The International Bureau of WIPO, dated Mar. 31, 2009.

* cited by examiner

*Primary Examiner* — Rexford Barnie
*Assistant Examiner* — Christopher Clark
(74) *Attorney, Agent, or Firm* — Locke Lord LLP

(57) ABSTRACT

The present disclosure is directed to systems and methods for controlling energy consumption in a system having a battery and including a controller and one or more solenoids. In accordance with the disclosure, the controller provides a controlling mechanism, such as a control algorithm, that will provide the necessary power to operate the one or more solenoids throughout the range of battery voltage in a manner that optimizes the voltage discharge from the battery and simultaneously maximizes battery life. Further power conservation measures are implemented by using a controller and an associated control algorithm to operate a solenoid throughout the range of battery voltage in a manner that places the discharge of the battery in reduced power consumption operating modes as the capacity of the battery is reduced.

11 Claims, 1 Drawing Sheet

SOLENOID CONTROLS, SYSTEMS, AND METHODS OF USE FOR OBTAINING OPTIMUM BATTERY LIFE

CROSS REFERENCE TO RELATED APPLICATIONS

The present application claims priority to U.S. Provisional Patent Application Ser. No. 60/847,482, filed Sep. 26, 2006, the contents of all of which are incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to controllers for use with batter-powered solenoids, and more particularly to controllers capable of providing intelligent controlling mechanisms which can provide the necessary power to operate such a solenoid while simultaneously maximizing battery life, as well as systems including such controllers and methods for their use.

2. Description of the Related Art

The use of solenoids in battery and battery-related applications and devices often require that the operating parameters for the coil or coils within the solenoid to be designed so as to be able to accommodate the lowest voltage that would be available from the battery in its end of life condition. For example, two alkaline battery cells could produce 3 volts when they are new, but at the end of life the voltage could be about 2.4 volts, or even as low as 1.8 volts, depending upon other limitations which may be specific to the device itself. If the coil is designed to operate at 2.4 volts, then when new batteries are used to power the device, the power consumption will be 56% greater than the value required to operate the solenoid. While this does not typically effect device function, it does have a significant negative impact on the battery life of the battery and the operation of the device, sometimes leading to device failure attributed to a depleted battery at inopportune times. In certain instances, depending upon the use of the solenoid, such premature battery failure can result in costly problems. Additionally, depending upon the specifics of the battery, replacement costs and/or disposal of prematurely expended batteries may be cost prohibitive.

Several approaches have been made in attempts to control, optimize, or extend the battery life of batteries associated with solenoids or solenoid-containing devices and apparatus. For example, for those devices where the solenoid contains a flow orifice within the solenoid, the size and geometry of the flow orifice within the solenoid has been adjusted so as to control or extend the associated battery life of the power source. Other approaches have involved the use of maintenance voltage. The disadvantages of many of these approaches, however, is that they are application specific, and cannot be readily adapted to a range of solenoid-containing devices.

Consequently, due to the high replacement cost of batteries and the environmental sensitivity to lead-based and other types of batteries, it is desirable to extend the life of batteries used to power solenoid-containing devices. It is desirable to have an apparatus for providing a control mechanism or algorithm that can provide the necessary power to operate the solenoid within or associated with a device, while simultaneously maximizing or extending the battery life of the battery source associated with the solenoid. Further, it is desirable to provide a solenoid control means, such as a control algorithm or method, which can operate a solenoid throughout the range of battery voltage in a manner that optimizes the discharge of the battery, and which may be modified to be application specific as necessary.

This application for patent discloses solenoid controllers, control algorithms, systems including such controllers and control algorithms, and methods for their use in optimizing battery life in systems comprising solenoids in battery applications.

BRIEF SUMMARY OF THE INVENTION

In accordance with one aspect of the present disclosure, a controller for use with a solenoid driven by a battery source having a range of battery voltage is described, the controller comprising a control algorithm capable of operating the solenoid throughout the range of battery voltage while simultaneously substantially optimizing the voltage output discharged from the battery source.

In accordance with a further aspect of the present disclosure, a method of using a controller to optimize power delivery to a solenoid from a battery is described, the method comprising dividing the operating time of the solenoid into a plurality of time periods using a controller algorithm; and optimizing the power delivered to each of the time periods using the controller, wherein the amount of power delivered in any of the time periods is at least the minimum amount necessary for normal operation of the solenoid. In accordance with this aspect, the controller may optimize the power delivered to each of the time periods using peak-and-hold methods or associated control algorithms. Such peak-and-hold methods may be capable of providing a higher power time interval to operate a solenoid initially, and then providing a reduction in battery power sufficient to maintain the solenoid in an engaged position for an extended period of time.

In accordance with yet another aspect of the present disclosure, a system for optimizing the battery life of a device comprising a battery-operated solenoid is described, the system comprising a battery capable of producing voltage to power a solenoid, a solenoid, and a controller capable of utilizing a control algorithm, wherein the control algorithm is capable of optimizing power consumption of the solenoid, monitoring the battery voltage and adjusting the voltage to the solenoid in an appropriate manner so as to minimize battery voltage output, and/or dividing the operation time line of the solenoid into a plurality of zones, wherein the power delivered from the battery to the solenoid is optimized in each zone.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
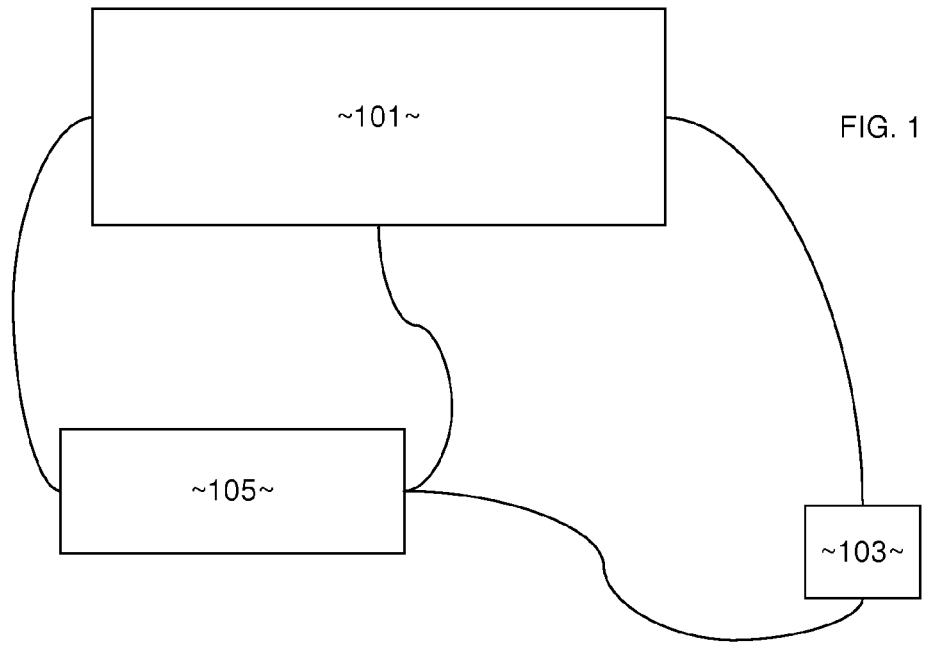
FIG. 1 illustrates a simplified block diagram of a system according to certain aspects of the present invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicants have created an intelligent controller 101 capable of simultaneously providing the power necessary to operate a solenoid 103 while simultaneously optimizing and maximizing battery 105 life, as well as systems for use with such controllers. This may be accomplished using a controller or control means capable of monitoring and adjusting battery voltage, using the peak and hold method to reduce battery power consumption by one or more solenoids.

Turning now to FIG. 1, a current versus time chart 10 is illustrated, showing generally how a controller or controller means, in accordance with the present disclosure can monitor a battery voltage output over time, using a control algorithm based on the operating time line of the solenoid of the device. Suitable controller or control means which may be used in accordance with the present disclosure are capable of generating and utilizing one or more control algorithms, such that the control algorithm is capable of both providing power to operate a solenoid (or the equivalent) and operating the solenoid throughout the range of voltage which can be produced by a battery associated therewith. This control algorithm, as generally described herein, is capable of operating a solenoid powered at least in part by a battery throughout the range of battery voltage in a manner that optimizes the discharge of the battery itself, such as by a peak-and-hold method. This, in turn, results in maximized battery life. The lower line, 12, in FIG. 1 represents the solenoid current over time, while the upper line 14 represents the controller output voltage over time (x-axis). As shown therein, the controller can divide the operating time line of the solenoid into a plurality of different zones, 20-29, as appropriate, and simultaneously optimizes the power delivered to each zone during each time period, so that the amount of power needed by the solenoid from the battery is the minimum needed based on proper operation of the solenoid or the solenoid-containing device itself It should be noted that the plurality of zones 20, 22, 24, 26, 27, 29 depicted and described herein, in association with FIG. 1, this number of zones is meant to be illustrative only. In accordance with aspects of the present disclosure, the plurality of different zones which the controller may divide the operating time line of the solenoids into can range from 2 to 20, or more (as appropriate), including but not limited to 3, 4, 6, 8, 10, 12, 14, 16, 18, and 20 'zones', as well as a number of zones between any of these numbers, such as 5, 7, 9, or 11 zones.

Figure 2:
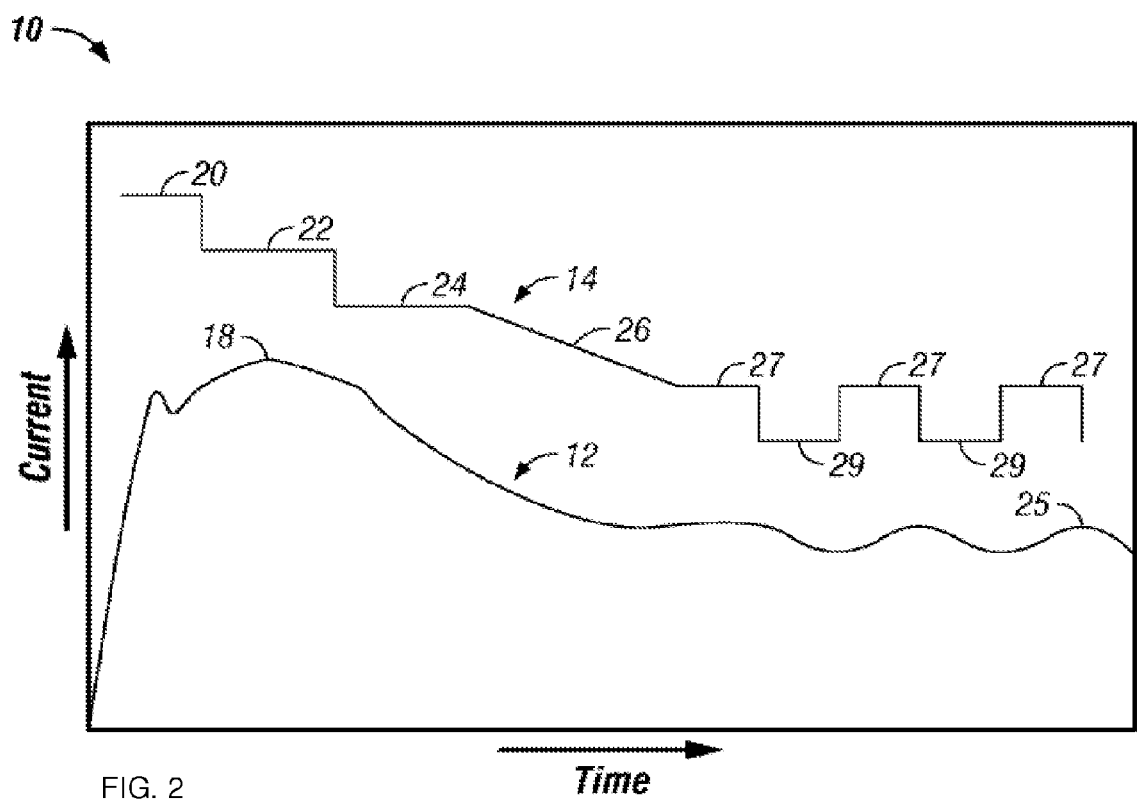
FIG. 2 illustrates a current versus time diagram illustrating how a controller and the associated algorithm can divide solenoid operating time, in accordance with an aspect of the present disclosure.

More specifically, as shown in FIG. 2, as the solenoid current 12 initially increases at the start of operation of the solenoid-containing device, there is a period of full output voltage 20 by the controller, as the flux in the solenoid builds up. In the next stage, 22, as the solenoid current is maximized at point 18, the controller steps down in current to a period of controlled power. This period of controlled power is equivalent to the operation of the solenoid and/or solenoid-containing device at a minimal voltage. In the succeeding period, as the solenoid current begins to decrease during device operation, the controller adjusts the output to a period 24 wherein the period has a controlled power of minimum voltage. This controlled power can range from about 60% to about 80%, more preferably from about 65% to about 75%, and even more preferably, about 70% of the minimum voltage.

As the solenoid current 12 begins to taper off, the controller output voltage 14 enters a controlled ramp down period of operating power, period 26, wherein the controller gradually reduces the output voltage from about 75% to about 60% over a period of time. Finally, as the solenoid enters the area of working current ranges, which may be in the shape of a sinusoidal wave 25 as illustrated in FIG. 1, the controller enters a holding period 28, wherein the controller adjusts the output voltage from the battery to the solenoid in such a manner so as to cause the solenoid or solenoid-containing device to operate at the lower level of retention. In accordance with an aspect of the present disclosure, the power level is oscillated between higher power levels 27 and lower power levels 29 at a rate of time that is designed to minimize the area under the current-versus-time curve 10, while simultaneously preventing the solenoid from losing retention.

The systems described herein comprise one or more solenoids associated with a plurality of devices and having a wide range of batteries, such batteries providing at least a portion of the power necessary to operate the solenoids. Suitable batteries for purposes of the present disclosure include but are not limited to alkaline batteries capable of producing from 1 V to 12 V of power, smaller batteries which produce from 0.1 mV to 1 V of power, alkali-metal (e.g., Li-ion), rare-earth, and transition element (e.g., lead) containing batteries, and batteries capable of producing greater than 12 V of power, e.g., up to and greater than 100 V. Thus, the range of suitable voltages ranges from about 0.1 mV to about 100 V, as well as values in between these values, including but not limited to 1 V, 2.5 V, 3.3 V, 4.2 V, 6 V, 9 V, 10 V, 12 V, 15 V, 16 V, 36 V, 100 V, and voltages between any two of these values.

The present disclosure has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims. Further, all of the compositions, processes, methods, systems, and/or apparatus disclosed and claimed herein can be made and executed without undue experimentation in light of the present disclosure. While the compositions and methods of this disclosure have been described in terms of preferred embodiments, it will be apparent to those of skill in the art that variations may be applied to the compositions, methods, apparatus and/or processes and in the steps or in the sequence of steps of the methods described herein without departing from the concept and scope of the invention. Additionally, it will be apparent that certain agents which are both chemically or mechanically/functionally related may be substituted for the agents described herein while the same or similar results would be achieved. All such similar substitutes and modifications apparent to those skilled in the art are deemed to be within the scope and concept of the invention

What is claimed is:

1. A controller for use with a solenoid driven by a battery source having a range of battery voltage, the controller comprising:
   a control algorithm capable of operating the solenoid throughout the range of battery voltage while simultaneously substantially optimizing the voltage output discharged from the battery source;
   wherein the controller is configured to peak the solenoid by first applying full output voltage, then step down the output voltage, then ramp down the output voltage, and then oscillate between two voltage levels to hold the solenoid.

2. A method of using a controller to optimize power delivery to a solenoid from a battery, the method comprising:
   dividing the operating time of the solenoid into at least three time periods using a controller algorithm; and
   optimizing the power delivered to each of the time periods using the controller,
   wherein the amount of power delivered in any of the time periods is at least the minimum amount necessary for normal operation of the solenoid;
   wherein the controller peaks the solenoid by first applying full output voltage, then steps down the output voltage, then ramps down the output voltage, and then oscillates between two voltage levels to hold the solenoid.

3. The method of claim 2, wherein the controller optimizes the power delivered to each of the time periods using peak-and-hold methods.

4. The method of claim 3, wherein the peak-and-hold methods are capable of providing a higher power time interval to operate a solenoid initially, and then a reduction in battery power sufficient to maintain the solenoid in an engaged position for a period of time.

5. A system for optimizing the battery life of a device comprising a battery-operated solenoid, the system comprising:
   a battery capable of producing voltage to power a solenoid;
   a solenoid; and
   a controller,
   wherein the controller is capable of generating and utilizing a control algorithm,
   the control algorithm capable of providing power to operate the solenoid and operating the solenoid throughout the range of voltage which can be produced by the battery, wherein the controller supplies at least two different voltage levels to the solenoid, wherein the controller is configured to peak the solenoid by first applying full output voltage, then step down the output voltage, then ramp down the output voltage, and then oscillate between two voltage levels to hold the solenoid.

6. The system of claim 5, wherein the control algorithm uses a peak-and-hold method.

7. The system of claim 5, wherein the control algorithm divides the operating time of the solenoid into a plurality of separate time zones and optimizes the power delivered to each zone during each time period.

8. The controller of claim 1, wherein the controller is configured to oscillate between two positive voltage levels to hold the solenoid.

9. The method of claim 2, wherein the controller oscillates between two positive voltage levels to hold the solenoid.

10. The system of claim 5, wherein the controller is configured to oscillate between two positive voltage levels to hold the solenoid.

11. The system of claim 5, wherein the controller is configured to step down the output voltage to between about 60% and about 80%, and then ramp down the output voltage to about 60%.

* * * * *